XR 3,174,414

CROSS REFERENCE SEARCH ROOM

March 23, 1965 J. H. MYER 3,174,414

OPTICAL APPARATUS FOR RECORDING SKIN RIDGE SIGNALMENTS

Filed Dec. 24, 1962 3 Sheets-Sheet 1

INVENTOR.

3174414
OR IN 354/62

March 23, 1965 J. H. MYER 3,174,414

OPTICAL APPARATUS FOR RECORDING SKIN RIDGE SIGNALMENTS

Filed Dec. 24, 1962 3 Sheets-Sheet 2

Jon H. Myer

INVENTOR.

March 23, 1965 J. H. MYER 3,174,414

OPTICAL APPARATUS FOR RECORDING SKIN RIDGE SIGNALMENTS

Filed Dec. 24, 1962 3 Sheets-Sheet 3

INVENTOR.

United States Patent Office 3,174,414
Patented Mar. 23, 1965

3,174,414
OPTICAL APPARATUS FOR RECORDING SKIN RIDGE SIGNALMENTS

Jon H. Myer, 1906 Beryl Lane, Newport Beach, Calif.
Filed Dec. 24, 1962, Ser. No. 246,817
4 Claims. (Cl. 95—1.1)

This invention relates to apparatus for recording the signalment of man and more particularly to apparatus utilizing photochemical or xerographic means for recording finger ridge patterns of individuals separately or in combination with photographs.

The idea of recording his unique signalment has occupied man's mind for centuries. Methods ranging from recording the anthropometrical signalment (consisting of exact measurements of height, reach of outstretched arms, length and width of head, etc.), descriptive signalment (including precise observations of the color of eyes, hair and complexion) and pathological signalment (localization and description of peculiarities such as deformities, scars, tattoos, etc.), have been used.

With the introduction of dactylography or fingerprinting and the Henry classification system, a simple means for establishing and verifying the signalment of an individual was found. However, presently applied dactylographic techniques leave much to be desired. In these methods printer's ink is required to be applied to the fingers, palms, or feet from which an imprint is taken by subsequently transferring the ridge patterns by contact printing methods which are subject to many errors and inconveniences.

The contact printing process requires the services of a skilled technician trained in the correct imprinting procedure. To make sure that the ridge pattern is correctly printed, the technician must transfer the critical areas of the body part to a recording medium by contacting the inked body part to that medium and employing a specific rolling motion to avoid smearing of the delicate skin ridge pattern.

In view of these and such other factors as the skills required in the execution of this process, the bodily contact required, the humiliation on the part of the individual involved by being soiled with printer's ink, the problem of printing ink pads acting as transfer agents for disease carriers which is a recognized risk in hospitals where the signalment of newborn babies is recorded by foot printing, and the necessity of utilizing special cleaning compounds and tissue, it can readily be seen that established dactylographic techniques have significant disadvantages.

It is therefore an object of this invention to provide improved means and methods for recording the signalment of an individual in an economical and efficient manner.

Another object of this invention is to provide improved means and methods for recording the signalment of an individual which does not require bodily contact with a recording medium such as ink or the like.

Another object of this invention is to provide improved means and methods of identification which are simple and rapid in operation.

These and other objects and advantages are realized by my invention which provides a signalment recording apparatus which utilizes optical means for portraying skin ridge patterns of individuals from which portrayals permanent records may be made by any of the known optical image recording techniques. Thus conventional photochemical photographic, as well as the electrostatic xerographic and electron beam photoelectric image recording techniques may be utilized according to the invention to permit the conservation of such patterns.

When a skin area of a body part of which an imprint is to be taken is supplied with a thin film of a suitable coupling medium and is pressed against the outside of a totally reflecting surface of a visually transparent denser medium, the total reflection of said surface is frustrated at the points of intimate contact and the image of the ridge pattern appears against a light background on the totally reflecting surface. The image thus appearing, however, is not the image of the print but rather the image of the ridge pattern being side-reversed in relation to its imprint. For the purposes of my invention it is therefore necessary to fold the optical light path in a manner permitting the required additional side reversal in order to obtain print patterns rather than ridge patterns.

These and other features and advantages of the invention will be explained in more detail in the following description taken in conjunction with the accompanying drawings in which.

Figure 1:
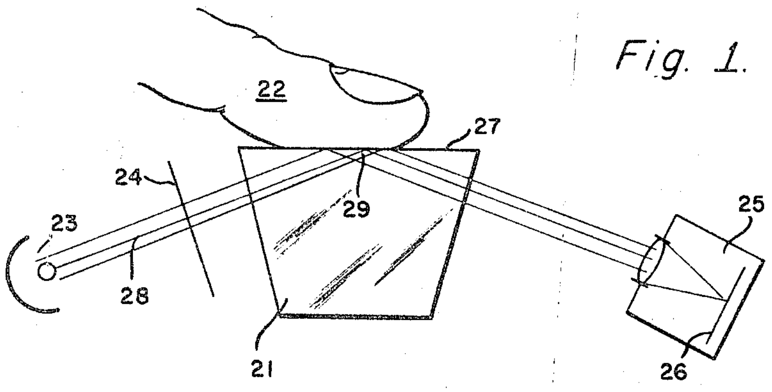
FIGURE 1 is an elevational view of the basic apparatus illustrating the operating principle of the present invention.

Referring now to the drawings, in FIGURE 1 apparatus is shown illustrating the principle of operation of the present invention. One of the features of the invention is the method of portraying dactylographic finger ridge patterns by a transparent optical element having a totally reflecting surface. Total internal reflection occurs when light waves in a denser medium meet a smooth reflecting surface separating this medium from a rarer one in which the wave velocity is greater, provided the angle of incidence is greater than a critical angle for the color of light used. When total internal reflection occurs in a medium, radiation can penetrate slightly beyond the reflecting surface into a rarer medium. Such penetration depends upon the wavelength of the radiation, its angle of incidence, and the ratio of the refractive indices between the two media. This phenomenon of penetration can be utilized to frustrate the total reflection completely at the points of intimate contact of an external body brought into close proximity and coupled with the totally reflecting surface from the side of the rarer medium. At the point of contact the radiation will penetrate into the contacting opaque body where it is absorbed. In this manner total reflection is frustrated at the points of contact forming a dark image of the points of contact against a total reflection mirror background. In this invention coupling between the finger of the person being fingerprinted according to the present invention and the optical element may be provided by intimate contact and by naturally occurring moisture and/or oils of the finger. It may also be desirable in some instances to apply an oily substance such as lanolin or glycerine to enhance the coupling action.

An analysis of the phenomenon of total reflection reveals that the sine of the critical angle (the minimal angle at which total reflection occurs) is equal to the ratio of the refractive indices of the less refractive rarer medium air to the more refractive medium glass. Glasses range in refractive index from 1.5 (ratio 0.668, critical angle 42 degrees) for the lightest crown glasses, to 1.9 (ratio 0.527, critical angle 32 degrees) for the heaviest flint. In order for a ray which is normally incident onto the front surface of a transparent optical element to be totally internally reflected by the back surface of said element, the front and back surfaces of said element must include an angle at least equal to the critical angle for said medium. The resulting oblique angles of viewing may cause a foreshortening of the print image which ranges from .67 for the lightest crown glass to .85 for the heaviest flint. Hence, in order to obtain minimum foreshortening, it is preferred to use a glass having as high a refractive index as possible.

In FIGURE 1 an optical element or a glass member 21 in the form of a truncated prism is utilized to provide a totally reflecting surface 27 against which a body part such as the finger 22 may be pressed. A virtual image of the ridge pattern of the finger is formed by means of a beam of light 28 generated by a flash or flood light source 23. The light beam 28 is passed through a fine grained light diffuser 24 to provide the background for the virtual image of the ridge pattern 29 which is seen by a camera 25 and may be recorded on a photochemical, xerographic, or photoelectric image-forming medium 26.

Figure 2:
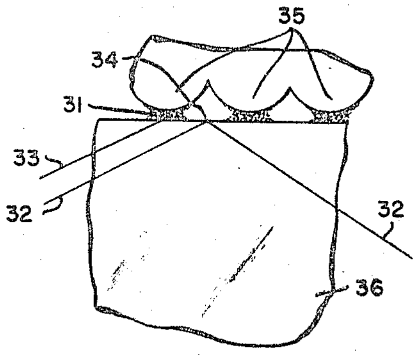
FIGURE 2 is an elevational view in detail of a portion of the apparatus shown in FIGURE 1 further illustrating this principle.

In FIGURE 2, the ridge pattern and the coupling medium is shown in more detail. The ridges 35 with a thin film of coupling medium 31 thereon totally frustrate the reflection of some light rays 33, thus generating the dark ridge pattern. Other light rays 32 impinge at the spaces between ridges and are totally internally reflected by the surface 34 of the optical element or transparent medium 36.

Figure 3:
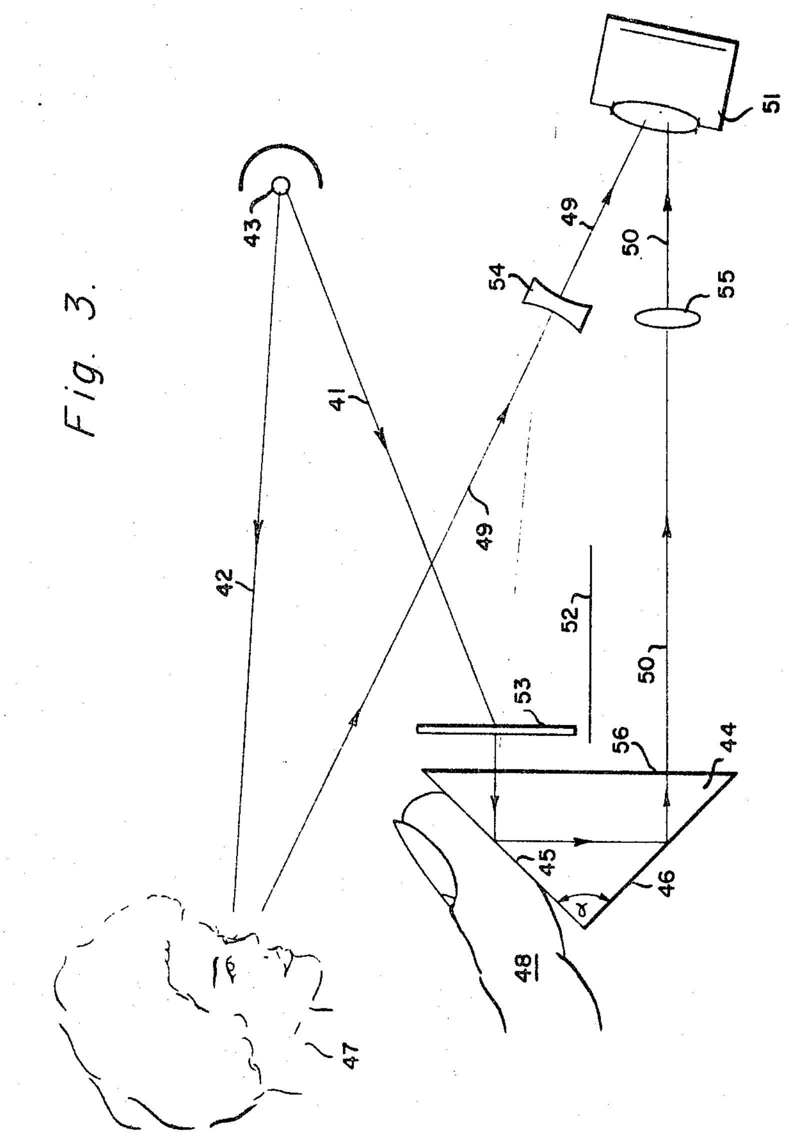
FIGURE 3 is an elevational view of an embodiment of the present invention.

An alternate embodiment of the invention is shown in FIGURE 3 in which the light source 43 illuminates one portion of the subject's body such as the face 47 via the light path 42 and another portion such as the skin ridge pattern 45 of a finger 48 by means of the diffuser 53 via the light path 41. The camera 51 records both the facial features 47 of the subject via the light path 49 and the virtual image of the side reversed ridge pattern via the light path 50.

The skin ridge pattern of the body part or finger 48 is formed on the totally reflecting surface 45 of the optical element or prism 44. The virtual image of this pattern is internally reflected by the second surface 46 of the prism 44 reversing the ridge image into a virtual print image. The included apex angle $\alpha$ of the prism should be 90 degrees to permit the whole image-forming area 45 to be reflected by surface 46 and eliminate unnecessary refraction of the image during the passage from the dense transparent medium prism 44 to air. For best performance surface 46 should be silvered. The lens systems schematically illustrated by 54 and 55 can be introduced into the two image light paths 49 and 50 to make the size of the feature image 47 similar to that of the print image formed at 45. A baffle 52 is provided to screen the exit side 56 of the prism 44 from the light source 43 thus increasing the contrast of the image by preventing light from illuminating the image forming area 45 through reverse reflection.

Figure 4:
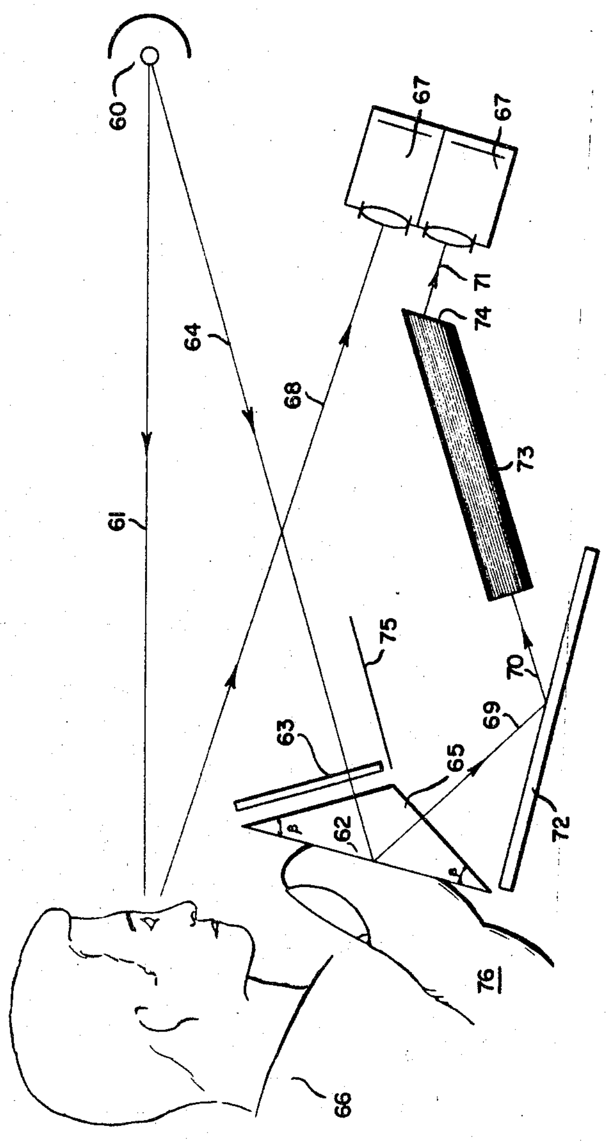
FIGURE 4 is an elevational view of another embodiment of the invention.

Another embodiment of this invention is shown in FIGURE 4. Here the light source 60 illuminates the facial features 66 of the subject via the light path 61 while simultaneously illuminating the totally reflecting surface 62 via the diffuser 63 through light path 64. The skin ridge pattern of the bodily part 76 is formed at 62. The transparent medium of high refractive index in which total reflection occurs is in the form of a prism 65 having side angle $\beta$ slightly larger than the critical angle of the high refractive medium from which it is made to permit operation as near as possible to normal incidence in order to obtain minimal foreshortening and distortion of the ridge pattern image formed on the totally reflecting surface 62. The image recording device 67 records both the facial features 66 via the light path 68 and the ridge pattern image formed at 62 via the light path 69–70–71. Along this latter path the ridge pattern image is first side reversed at the front surface mirror 72 and transmitted via the optical fiber bundle 73 consisting of a large number of microscopically thin optically transparent fibers which dissect and transmit the image formed at 62 along their length, each fiber conserving its fractional part of the image due to total internal reflection. The fiber bundle 73 serves to maintain the size of the ridge pattern image and restore its proportions by elongating the foreshortening at its angular terminus 74. Fiber bundle 73 could also be used to quantize the image of the ridge pattern for subsequent data processing and reduction. The baffle 75 is provided to shield the exit face of the prism from the light source 60.

There thus has been disclosed an apparatus for recording the signalment of an individual which is simple but at the same time very reliable and requiries no special skills in its operation, and is therefore more economical than techniques or apparatus heretofore known in the art.

What is claimed is:

1. Signalment recording apparatus comprising, in combination, light image sensitive recording means for recording the image of the facial features of a subject and an image of the skin ridge pattern of a bodily part of said subject, a dense medium optical element having a totally internally reflecting surface adapted to have a skin ridge pattern formed thereon by contact therewith of said subject's skin ridges from the side of an adjacent rare medium thereby causing frustration of total reflection at the points of said contact, means for illuminating said facial features and said skin ridge pattern, first optical means between said totally internally reflecting surface and said recording means for side-reversing said skin ridge pattern image, and second optical means disposed between said first optical means and said recording means for adjusting the relative sizes of said facial and said skin ridge pattern images relative to each other.

2. An apparatus according to claim 1 in which said optical adjustment means consists of a lens system disposed in the ridge pattern image light path.

3. An apparatus according to claim 1 in which said optical adjustment means consists of a lens system disposed in the facial feature image light path.

4. Signalment recording apparatus comprising, in combination, light image sensitive recording means for recording the image of the facial features of a subject and an image of the skin ridge pattern of a bodily part of said subject, a dense medium optical element having a totally internally reflecting surface adapted to have a skin ridge pattern formed thereon by contact therewith of said subject's skin ridges from the side of an adjacent rare medium thereby causing frustration of total reflection at the points of said contact, means for illuminating said facial features and said skin ridge pattern, first optical means disposed between said totally internally reflecting surface and said recording means for side-reversing and adjusting the proportions of said skin ridge pattern image, and second optical means disposed between said first optical means and said recording means for adjusting the relative sizes of said facial and said skin ridge pattern images relative to each other.

References Cited by the Examiner

UNITED STATES PATENTS

| | | | |
|---|---|---|---|
| 2,195,699 | 4/40 | Johnson | 88—24 |
| 2,830,512 | 4/58 | Nagel | 95—1.1 |
| 3,058,021 | 10/62 | Dunn | 88—1 X |
| 3,083,623 | 4/63 | Mott | 95—1.7 |

FOREIGN PATENTS

| | | |
|---|---|---|
| 432,240 | 7/26 | Germany. |

NORTON ANSHER, *Primary Examiner.*

JOHN M. HORAN, *Examiner.*